No. 613,875. Patented Nov. 8, 1898.
J. T. AUSTIN.
MARINE GOVERNOR.
(Application filed Feb. 26, 1898.)
(No Model.) 2 Sheets—Sheet 2.

Witnesses
A. L. Hobby

Inventor
John T. Austin

UNITED STATES PATENT OFFICE.

JOHN T. AUSTIN, OF DETROIT, MICHIGAN.

MARINE GOVERNOR.

SPECIFICATION forming part of Letters Patent No. 613,875, dated November 8, 1898.

Application filed February 26, 1898. Serial No. 671,733. (No model.)

*To all whom it may concern:*

Be it known that I, JOHN T. AUSTIN, a citizen of the United States, residing at Detroit, in the county of Wayne and State of Michigan, have invented certain new and useful Improvements in Marine Governors, of which the following is a specification, reference being had therein to the accompanying drawings.

This invention is intended to prevent the screw of vessels from racing as a result of the action of the waves in a high sea, where the screw is liable to be at times partly or entirely out of the water.

In carrying out my invention I make use of a fluid-motor the conditions of rest or movement of which in one direction or the other are controlled by a valve. This fluid-motor I suitably connect with the valve which admits the motive agent to the engine which turns the screw, so that the fluid-motor controls the motive power of the engine. The valve which controls this fluid-motor is in turn controlled by a governor, and my invention involves the novel use of electricity for the purpose. To this end I employ another fluid-motor the conditions of rest or movement of which depend upon the opening or closing of a valve or valves, each of which is under the control of an electromagnet in a normally open circuit, which includes a circuit-closing device arranged in the walls of the vessel in proximity to the screw and operating by hydrostatic pressure, whereby upon the recedence of a wave and the consequent diminishing or entire removal of the hydrostatic pressure upon the circuit-closer the electric circuit is closed, and the fluid-motor of the governor being set in motion changes the condition of rest of the regulating-motor and starts the same to reduce or shut off the supply of the motive agent to the engine till the normal condition of working for the screw has been restored, which also restores the parts to their normal condition of rest.

Instead of a single motor for the governor I preferably employ two or more connected together for joint operation, each motor being controlled by an independent circuit, and the circuit-closers which control these circuits I locate at different heights in the wall of the vessel near the screw, so that they will become operative one after another, according to the degree at which the vessel—that is, the screw—is lifted out of the water, the amount of regulation being thus proportioned to the requirements. In this way the regulation may be made as close as desired.

Figure 1:
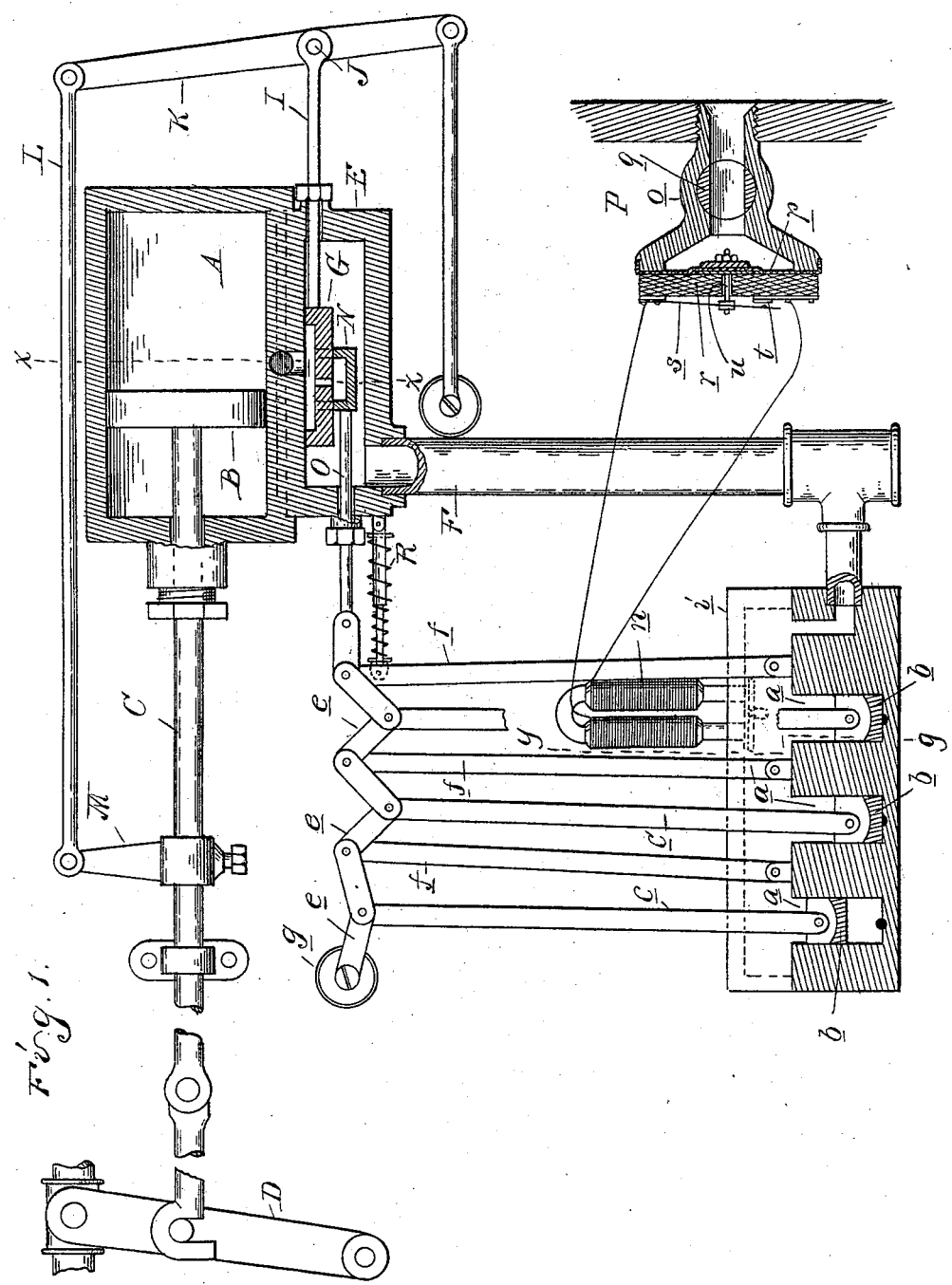
Figure 2:
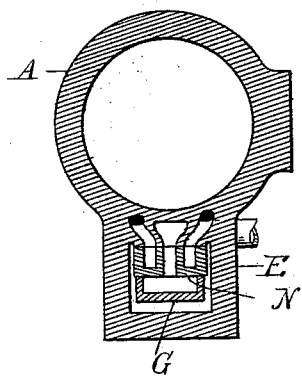
Figure 3:
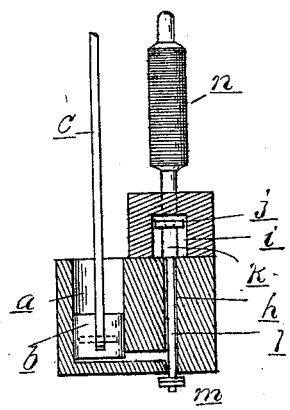
Figure 4:
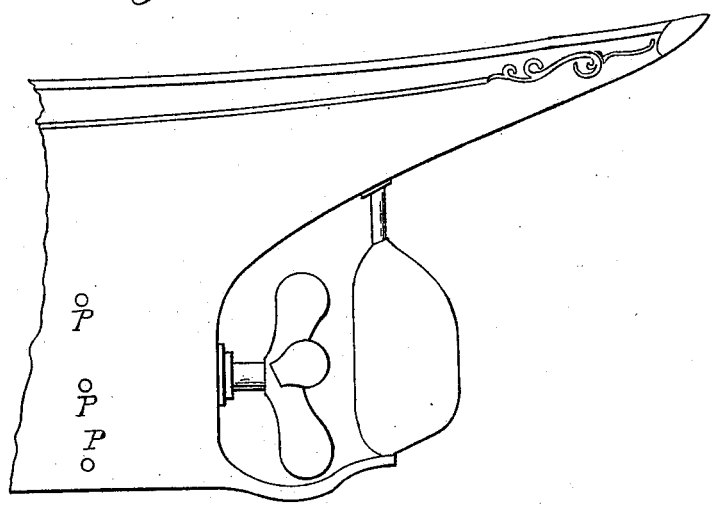

In the drawings, Figure 1 is an elevation representing my invention in diagrammatic form, partly in section. Fig. 2 is a cross-section on line $x\,x$, Fig. 1. Fig. 3 is a cross-section on line $y\,y$, Fig. 1; and Fig. 4 is an elevation of the stern of a vessel, showing the location of the hydrostatic circuit-closers.

A is the cylinder of the regulating fluid-motor, B is the piston thereof, and C is a piston-rod, the latter passing through suitable guides and is suitably connected to the arm D of the throttle-valve of the engine, all in such manner as to turn the throttle-valve in one direction or another by the movement of the piston.

The cylinder is provided with a valve-chest E, into which the supply-pipe F for the motive agent is attached.

G is a slide-valve secured to a lever I, one end of which is fulcrumed at J to the end of the link K, and the other end is pivotally connected by a connecting-rod L to the arm M of the piston-rod.

N is a pilot-valve controlling the valve G and being operated by means of a valve-stem O.

The parts being arranged as shown and described, the motor is of that well-known character wherein the condition of rest or movement of the pilot-valve N produces a similar condition of rest or movement in the piston B, the movement of the latter thereby effecting the regulation of the throttle-valve and keeping the same in any adjusted position as long as the pilot-valve N is maintained in its condition of rest.

The position of the pilot-valve N is controlled by a governor, which comprises one or more fluid-motors, a corresponding number of electric circuits, and a corresponding number of hydrostatic circuit-closers P for independently controlling each of the motors. In the drawings there are shown three of such fluid-motors, in which $a$ are the cylinders, $b$ the pistons, and $c$ the piston-rods, which are pivotally connected at their lower ends to the piston and at their upper ends to a pair of links or toggles *e e*. These toggles are pivotally connected with each other, with the links *f*, the end of the valve-rod O, and with the fixed abutment *g* in such manner that they form a lengthening or shortening device for the valve-rod O, in which the movement of each toggle-joint by reason of the movement of its piston imparts a definite degree of movement to the pilot-valve N. The cylinder *a* communicates at the bottom with the passage *h*, which at one end communicates into the valve-chest *i* and at the other end into the atmosphere. Within this valve-chest is an armature *j*, which carries below it a valve *k*, adapted to seat on the top of the passage *h*, and this valve, through the stem *l*, carries an exhaust-valve *m*, which controls the outlet from the passage *h* into the atmosphere.

Above the valve-chest *i* is an electromagnet *n*, the poles of which are in such proximity to the armature *j* as to attract the same when the magnet is energized, whereby the valve *k* admits the motive agent from the valve-chest, through the passage *h*, into the cylinder and simultaneously closes the exhaust-port by the valve *m*. The electromagnet *n* is included in circuit with a suitable electric source and with one of the hydrostatic circuit-closers.

The hydrostatic circuit-closer comprises an open-ended casing *o*, one end of which is extended through the wall of the vessel and the other end of which is closed by a diaphragm *p*, all in such manner that the water from the outside has access to the diaphragm, and a valve *q* is preferably interposed to shut off the access of the water in case of damage to the diaphragm. Upon the diaphragm is secured an insulating-base *r*, which carries the movable and fixed contacts *s* and *t*, respectively, being the terminals of the electric circuit of the magnet. The movable contact *s* is adjustably connected to the diaphragm by a pin *u* in such manner that the pressure of the water upon the diaphragm will normally hold the contacts apart. In practice these hydrostatic circuit-closers are arranged in the wall of the vessel in proximity to the screw and are placed below the normal water-line at different points of immersion and in such relation to the screw that if in a high sea the screw is lifted out of the water one or more of the circuit-closers will simultaneously therewith close an electric circuit and by energizing the magnet of that circuit will admit the motive agent to the motor, raising the piston and correspondingly therewith expanding the toggle and producing an expansion of the valve-rod O, shifting the pilot-valve N, and producing a corresponding movement of the piston B.

The degree of expansion of the valve-rod O and the corresponding degree of movement of the piston B and throttle-valve depend upon the number of hydrostatic circuit-closers which have become operative.

As soon as the normal condition of pressure is restored at each hydrostatic circuit-closer the corresponding circuit is opened, the magnet releases the armature, the valve controlled thereby permits the fluid agent to exhaust, and the piston returns to its normal position by the action of a spring R.

What I claim as my invention is—

1. In a governor for marine engines, a combination with a controlling-valve for the engine and motor for operating the same, of a governor for controlling the operating-motor, comprising a series of motors, means for supplying motive agent such as steam to the respective governor-motors, valves for controlling the supply of steam and means governed by hydrostatic pressure on the hull for controlling the valves which control steam-supply of the governor-motors, substantially as described.

2. In a governor for marine engines, the combination with the controlling-valve for the engine and a controlling means therefor, of a series of motors for said means, each motor adapted to give the valve a determined amount of movement, and electric controlling means for each motor comprising circuit-closing devices arranged at different levels, operated by a change in hydrostatic pressure on the hull at the point adjacent to the screw.

3. In a governor for marine engines, the combination with the controlling-valve for the engine and a motor therefor, of the pilot-valve N and an actuating device therefor comprising a series of connected toggles, a series of motors controlling said toggles separately and electric controlling device for each motor, comprising circuit-closers arranged on different levels, controlled by the hydrostatic pressure on the hull adjacent to the screw.

In testimony whereof I affix my signature in presence of two witnesses.

JOHN T. AUSTIN.

Witnesses:
  OTTO F. BARTHEL,
  LIONEL BATTERSBY.